US012601133B2

(12) United States Patent
Annappa et al.

(10) Patent No.: US 12,601,133 B2
(45) Date of Patent: Apr. 14, 2026

(54) ELECTRIC DRIVE TRAIN OF A SOIL COMPACTOR

(71) Applicant: DANA ITALIA S.R.L., Arco (IT)

(72) Inventors: Amith Annappa, Pimpri Chinchwad (IN); Shailesh Dalvi, Pune (IN); Pradip Jasud, Pune (IN)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/799,038

(22) Filed: Aug. 9, 2024

(65) Prior Publication Data

US 2026/0043209 A1     Feb. 12, 2026

(51) Int. Cl.
| | |
|---|---|
| *E02D 3/026* | (2006.01) |
| *B60K 1/00* | (2006.01) |
| *B60K 17/28* | (2006.01) |

(52) U.S. Cl.
CPC .............. *E02D 3/026* (2013.01); *B60K 1/00* (2013.01); *B60K 17/28* (2013.01); *B60K 2001/001* (2013.01)

(58) Field of Classification Search
CPC .......... E02D 3/026; B60K 1/00; B60K 17/28; B60K 2001/001; B60K 6/387; F16H 2057/02034
See application file for complete search history.

(56) References Cited

U.S. PATENT DOCUMENTS

| | | | |
|---|---|---|---|
| 11,312,218 B2 | 4/2022 | Serrao et al. | |
| 11,655,863 B1 | 5/2023 | Versini et al. | |
| 11,884,151 B1 | 1/2024 | Cattoor et al. | |
| 2022/0176803 A1* | 6/2022 | Vassieux | B60K 6/48 |
| 2022/0266673 A1* | 8/2022 | Vassieux | F16F 15/123 |
| 2024/0239179 A1* | 7/2024 | Van Raepenbusch | B60K 6/48 |

FOREIGN PATENT DOCUMENTS

| | | | |
|---|---|---|---|
| DE | 102016217920 A1 * | 3/2018 | B60K 1/00 |
| DE | 102020101667 A1 | 7/2021 | |

OTHER PUBLICATIONS

Espace translation of DE 10 2016/217920 A1 (Year: 2016).*

* cited by examiner

*Primary Examiner* — Jason D Shanske
*Assistant Examiner* — Scott Lawrence Strickler
(74) *Attorney, Agent, or Firm* — McCoy Russell LLP

(57) ABSTRACT

The description discloses an electric drive train of an off-highway vehicle. The drive train comprising: a drive axle; a gearbox connected to the drive axle, where the gearbox comprises a gear train, where the gear train comprises an input gear, an intermediate gear, a PTO output gear, and a disconnect clutch configured to selectively couple the intermediate gear to the drive axle; an electric motor, where the electric motor is mounted on the gearbox in a longitudinal direction of a vehicle and coupled to the input gear; and a PTO device mounted on the gearbox alongside the electric motor and coupled to the PTO output gear. The off-highway vehicle has one or more auxiliary devices driven by the PTO device. The PTO device may drive the auxiliary devices.

18 Claims, 9 Drawing Sheets

ELECTRIC DRIVE TRAIN OF A SOIL COMPACTOR

TECHNICAL FIELD

The invention relates generally to a system of an electric drive train for an off-highway vehicle including a PTO driven auxiliary device, such as a vibratory roller. The system includes a gearbox with a disconnect that drivingly couples an electric machine to a PTO.

BACKGROUND AND SUMMARY

Vehicles, such as soil compactors, may include a vibratory roller. The drive train of the vehicle may include a traction motor, vibration motor and a roller drive motor. The vibrator motor may vibrate the vibratory roller. The roller drive motor may drive and rotate the vibrator roller. The vibration motor and roller drive motor may be hydraulic motors powered hydraulically via a pump, referred to herein as a tandem pump. The tandem pump may in turn be driven via an engine. The traction pump may drive a hydraulic motor that may in turn drive a drive axle and wheels attached thereto. The vehicle may be driven in a direction by driving of the drive axle and the vibratory roller via the roller drive motor, where the drive axle is driven via the hydraulic motor, and the hydraulic motor is driven via the engine.

Using an engine to drive the tandem pump may result in higher power losses to the drive train compared to an electric machine via the conversion of rotational energy to hydraulic energy and back to rotational energy. More engines, multiple motors, and pumps for the drive train of a vibratory roller vehicle may increase complexity and therein maintenance compared to other drive trains of vehicles. Likewise, the drive train may have increased heat accumulation (e.g., decreased thermal efficiency) compared to other drive trains of other vehicles.

The inventors have recognized these and other issues with such systems. As developed in one example is a drive train comprising: a drive axle; a gearbox connected to the drive axle, where the gearbox comprises a gear train, where the gear train comprises an input gear, an intermediate gear, a PTO output gear, and a disconnect clutch configured to selectively couple the intermediate gear to the drive axle; an electric motor, where the electric motor is mounted on the gearbox in a longitudinal direction of a vehicle and coupled to the input gear; and a PTO device is mounted on the gearbox alongside the electric motor and coupled to the PTO output gear.

The gear train may be selectively coupled via a disconnect feature, the disconnect feature being a disconnect assembly that includes the disconnect clutch. When selectively coupled, one or more movers, including the electric machine, may be drivingly coupled to the drive axle. When coupled, rotational energy may be transmitted to the drive axle from the mover via the gear train without converting rotational energy to hydraulic energy and converting hydraulic energy back to rotational energy. The disconnect clutch may be in an engaged state to selectively and drivingly couple the electric machine to the drive axle via the gear train. The disconnect clutch may be in a disengaged state to decouple the electric machine from the drive axle via the gear train. When the disconnect clutch is engaged and disengaged, the electric machine may be drivingly coupled to the PTO device. The electric machine may parallel drive the PTO device with the driven axle when selectively and drivingly coupled via the gear train. Power and rotational energy may be split via the intermediate gear between the PTO device and the drive axle. For example, power may be split when the drive axle is selectively coupled to the intermediate gear via the disconnect clutch.

In this way, it is possible to provide an assembly that is compact and robust which reduces a need for additional electric motors and inverters for use in auxiliary functions. For example, additional electric motors that drive auxiliary devices, such as steering devices or power auxiliary components such as an edge cutter, chip spreader, sprinkler, etc., can be reduced, downsized, and/or eliminated. Likewise, in soil compactor applications, direct mounting of the electric motor and the hydraulic pump (PTO) on a rear drive axle may increase packaging space on the vehicle. Battery pack placement in a rear space and optimization of the vehicle chassis is therefore possible with the increased packaging space available around and enclosed by the chassis.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
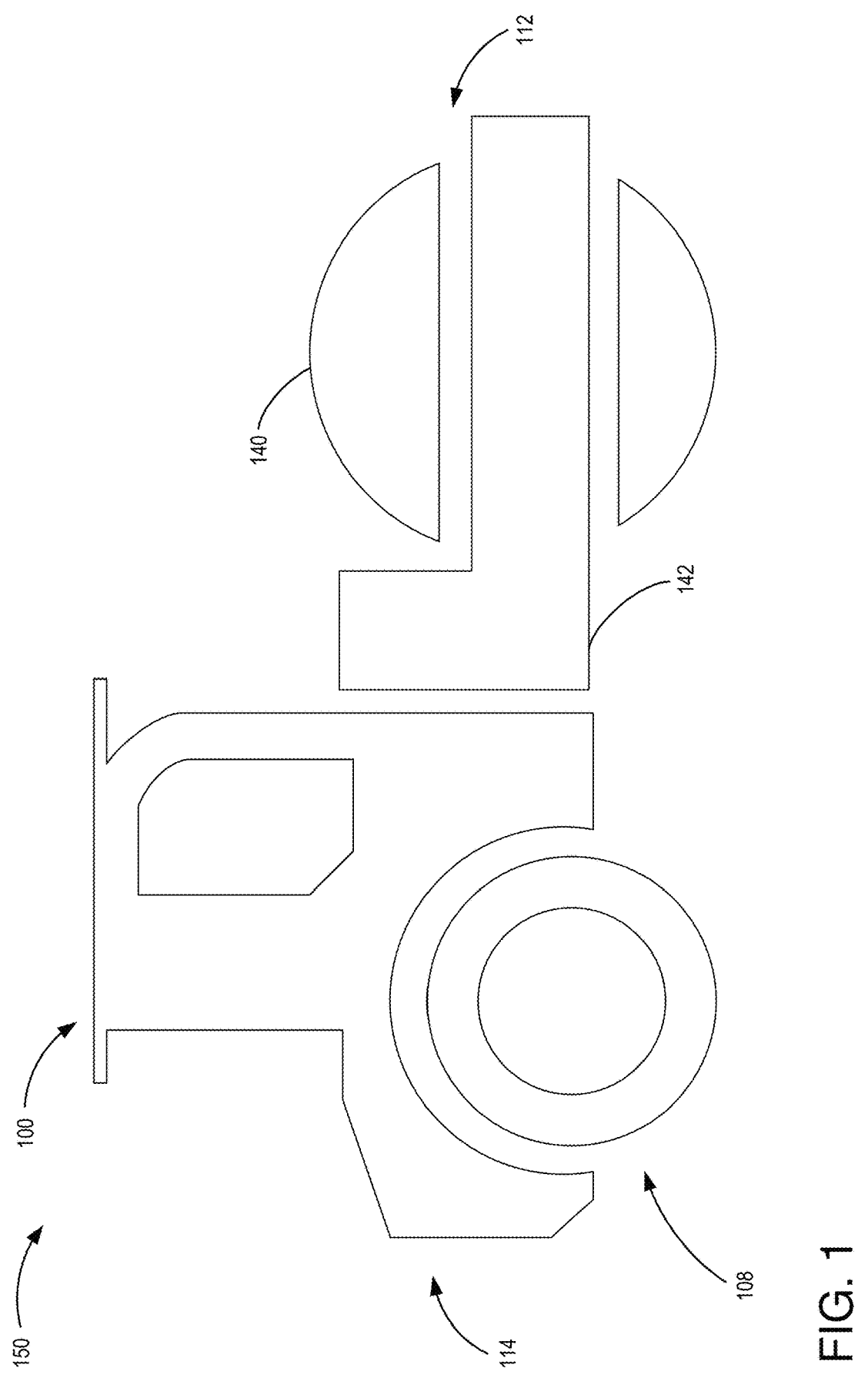
FIG. 1 shows a schematic of a vehicle with a vibratory roller.

The following description relates to systems of an electrified drive train configuration for a vehicle. A driveline of the systems comprises an axle assembly including a drive axle connected with an electric machine and a power takeoff (PTO) device. The electrified drive train incorporates one or more of a plurality of electric machines that may drive components using rotational power and hydraulic power. The electrified drive train may be implemented in an off-highway vehicle with a vibratory roller, such as a soil compactor. The electrified drive train includes a vibrational motor and a roller drive motor that may vibrate and rotate/drive the vibratory roller. The electric machines may be electric motors or electric motors/generators. The vibrational motor and the roller drive motor may be supplied with hydraulic fluid and power via a hydraulic pump, referred to alternatively as a vibrational pump herein. Likewise, the vibrational pump and/or another hydraulic pump, such as a steering pump, may deliver hydraulic fluid and power to a plurality of consumers for functions of the vehicle, such as for steering, crab walking, edge cutting, and chip spreading.

The PTO device comprises a first hydraulic pump and may comprise or be configured to output rotary power to a second hydraulic pump. The first hydraulic pump may provide hydraulic power to a first fluid circuit for driving and vibrating the vibratory roller via a hydraulic motor and a vibratory motor, respectively. The second hydraulic pump may provide hydraulic power to a second fluid circuit for driving other auxiliary devices, including steering devices. The electrification of the driveline may decrease noise, vibration, and harshness (NVH) experienced by an occupant of the vehicle compared to a non-electrified driveline. Likewise, electrification of the driveline may decrease noise to an environment surrounding the vehicle.

The drive axle assembly comprises a gearbox with two inputs, including a first input to mount the electric machine and a second input to mount the PTO device and/or vibrational pump. During a first operating mode, the electric machine (e.g., electric motor) may drive the drive axle for traction and parallel drive the PTO device. The gearbox and the drive axle assembly includes a disconnect feature, the disconnect feature being a disconnect assembly that includes and may shift a disconnect clutch. The disconnect feature is provided to power the PTO device when traction is not desired, such that the hydraulic pump may hydraulically power auxiliary functions like steering, or power auxiliary components such as an edge cutter, chip spreader, sprinkler, etc. The disconnect clutch may close to selectively couple the gear train, splitting rotary power between the PTO device and the drive axle. The disconnect clutch may open to provide rotary power to the PTO device and prevent or reduce rotary power from being transferred to the drive axle. Various driveline ratios may be achieved by altering gearbox ratios and/or the crown gear and pinion ratios. Fixing an electric motor with the drive axle drive train in this way may make the axle assembly more compact, saving space.

In this or another interpretation, the assembly is compact and robust which prevents additional electric motors and inverter for auxiliary functions. Likewise, in soil compactor applications, direct mounting of the electric motor and the hydraulic pump (PTO) on rear drive axle increases space on vehicle. The configuration of the assembly allows for the battery pack placement in rear space of the vehicle; additionally, further optimization of vehicle chassis to is possible, where the packing space available around and enclosed by the chassis is increased.

Figure 2:
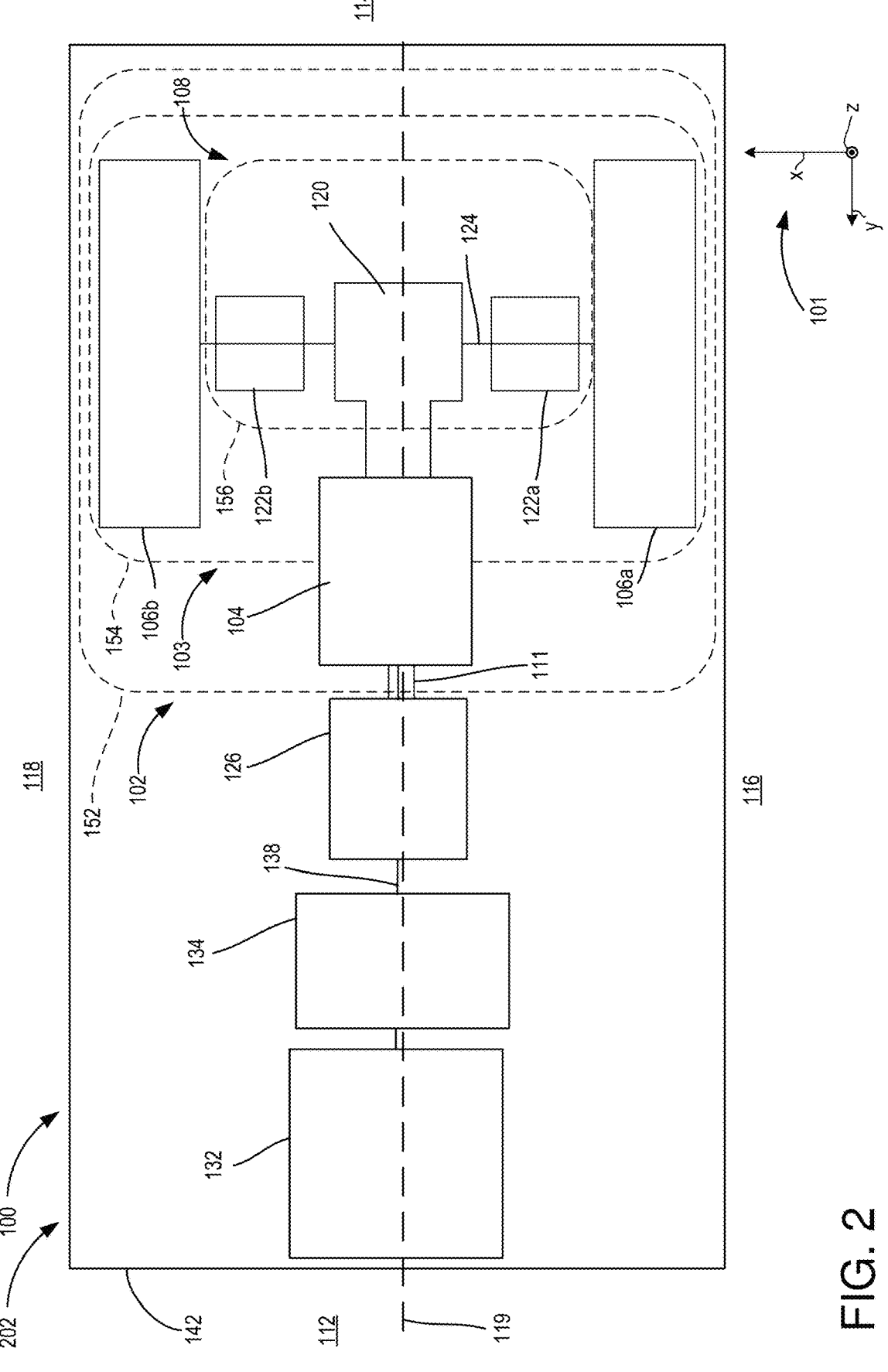
FIG. 2 shows a schematic of an electrified drive train for a driven axle.
Figure 3:
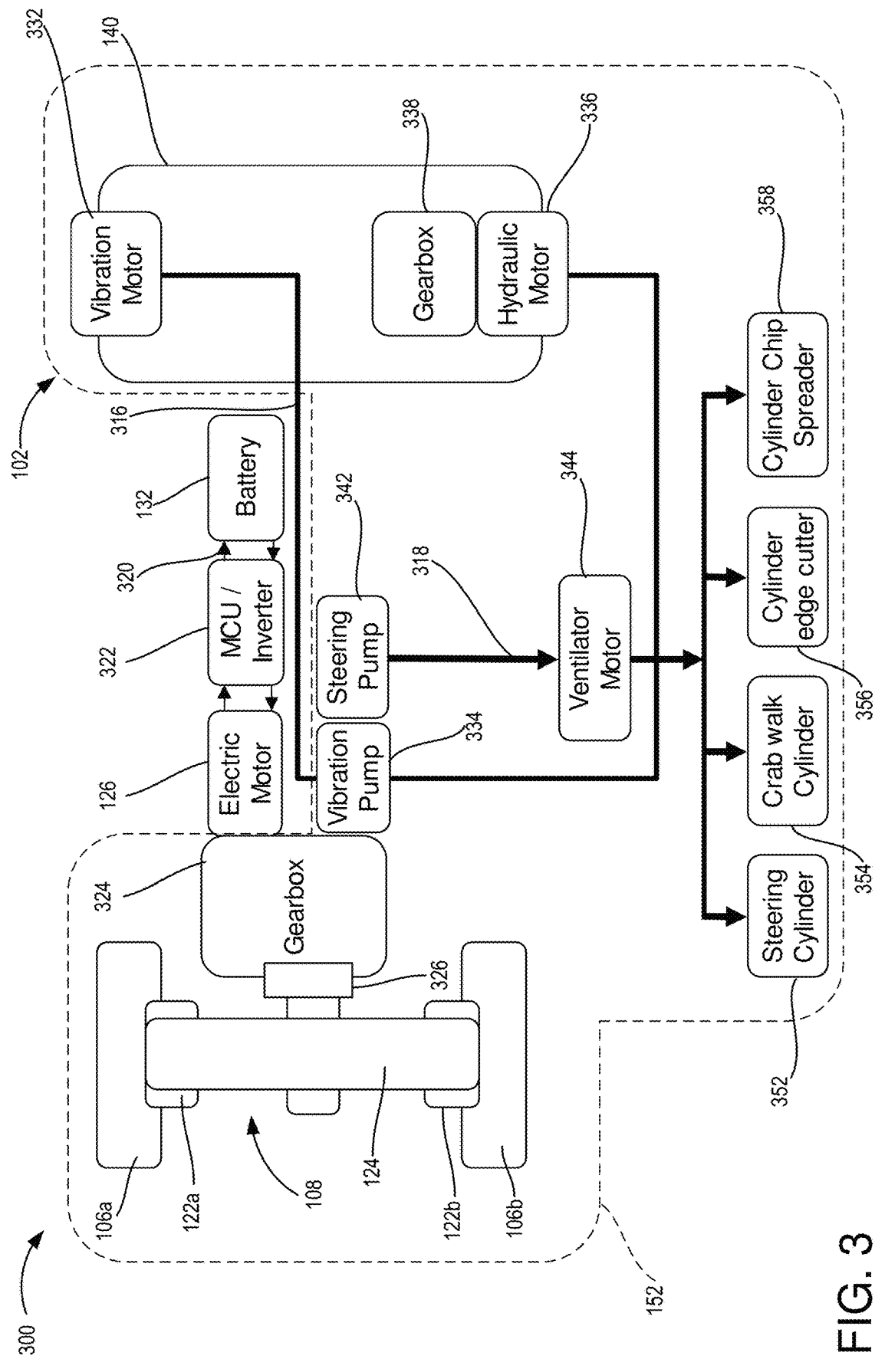
FIG. 3 shows a block diagram for a system for the drive train of the vehicle including electrified and hydraulic components.
Figure 4:
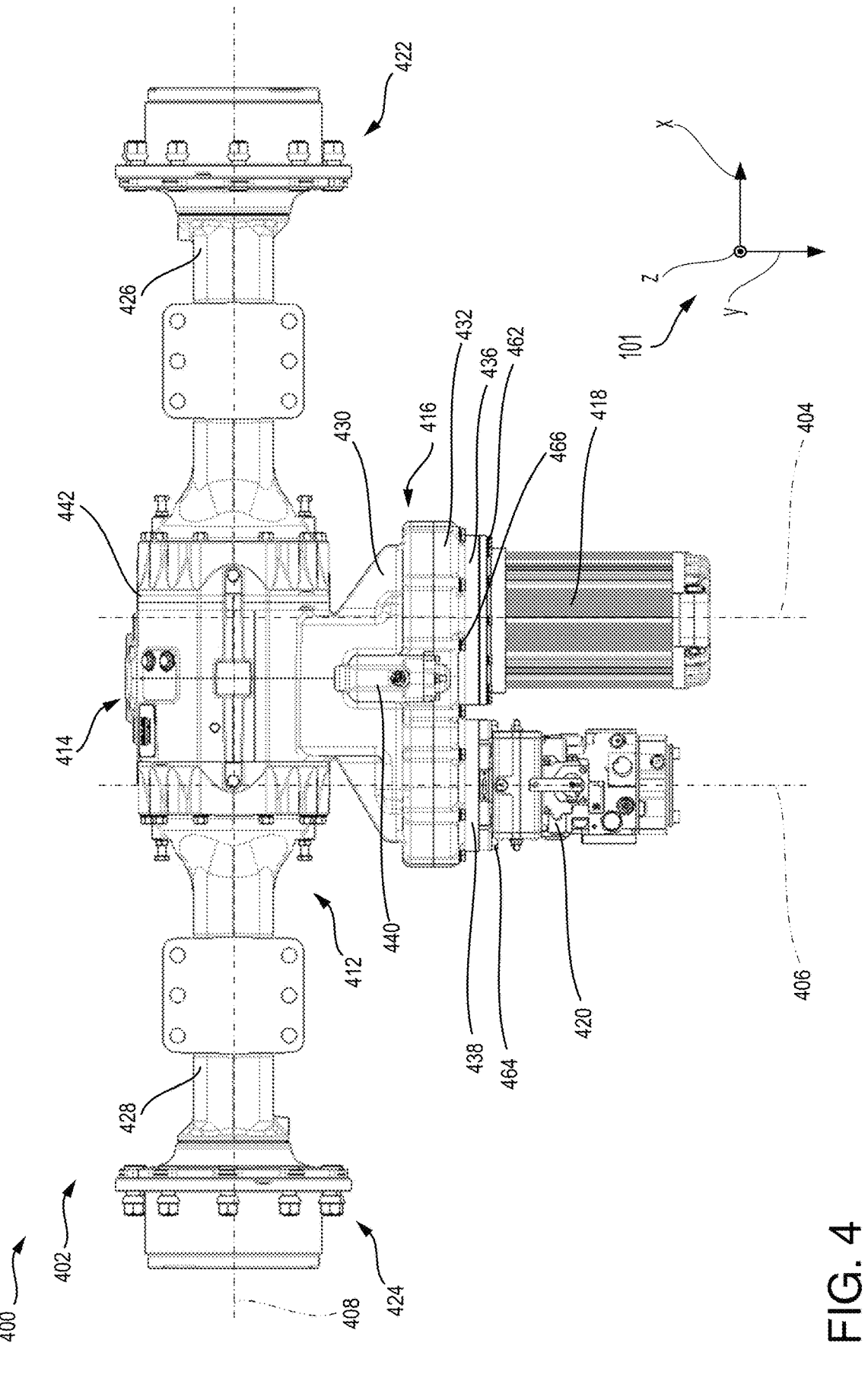
FIG. 4 shows a top view of a drive axle assembly.
Figure 5:
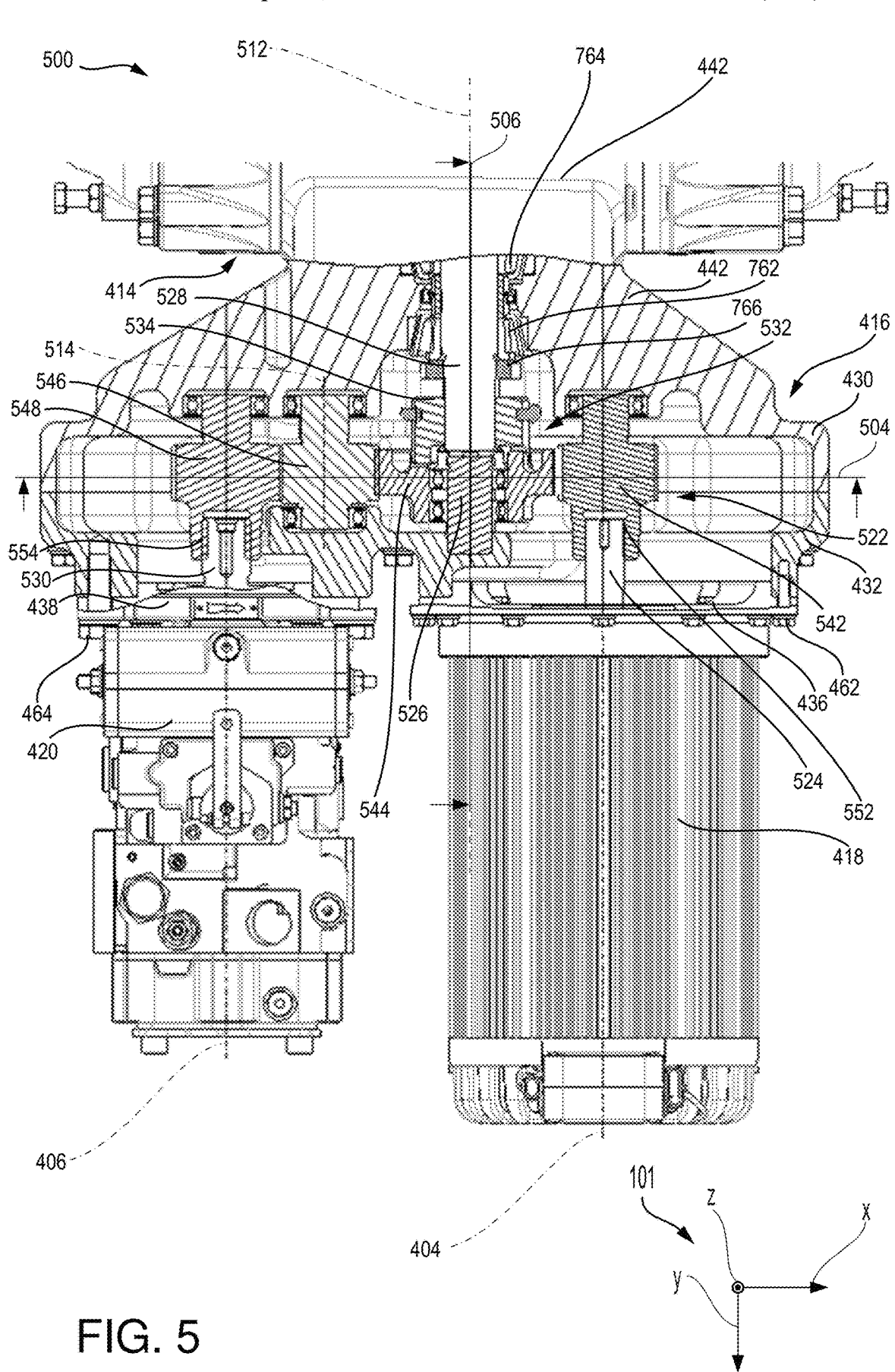
FIG. 5 shows sectional view of a gearbox assembly.
Figure 6:
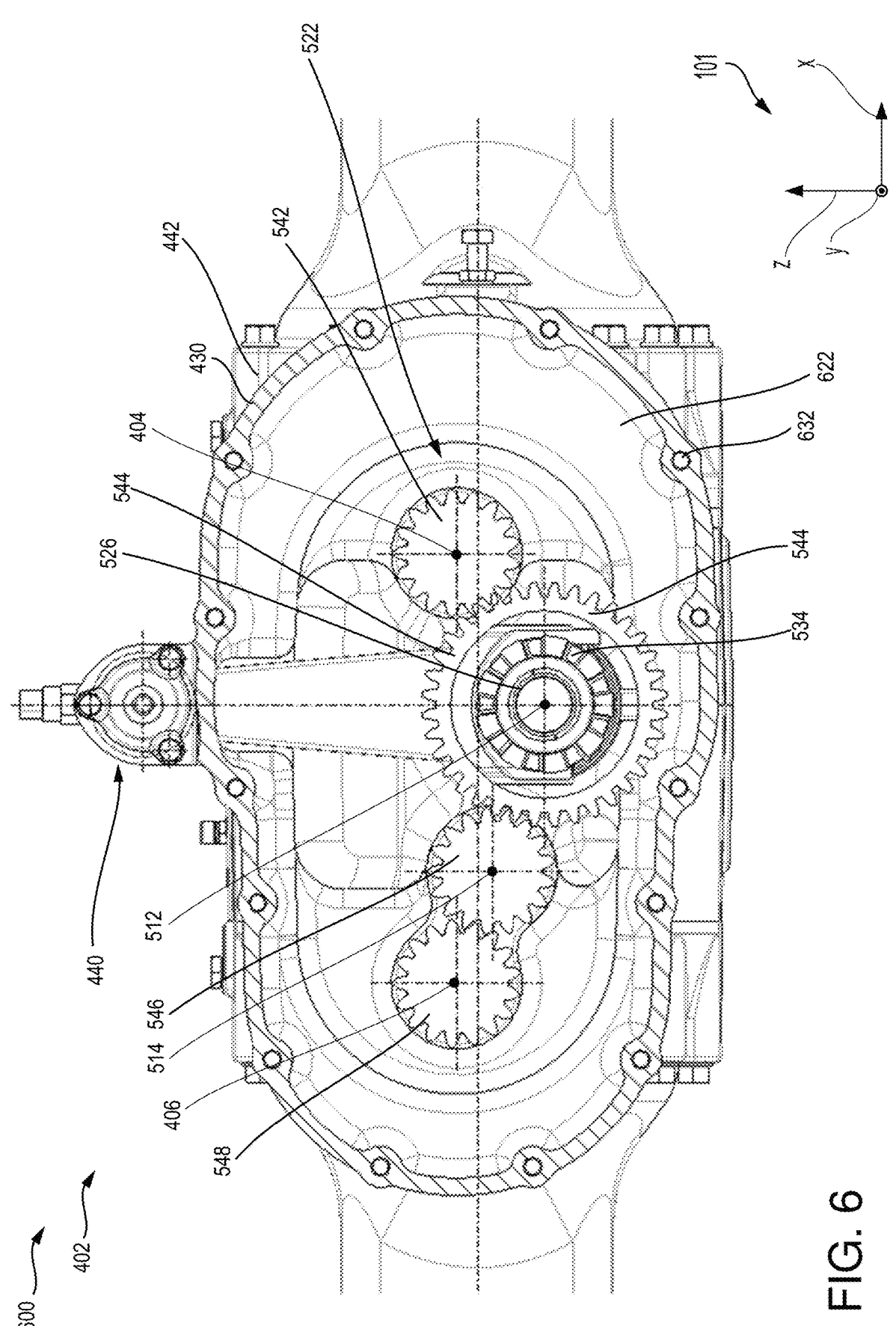
FIG. 6 shows a sectional view of the gearbox assembly.
Figure 7:
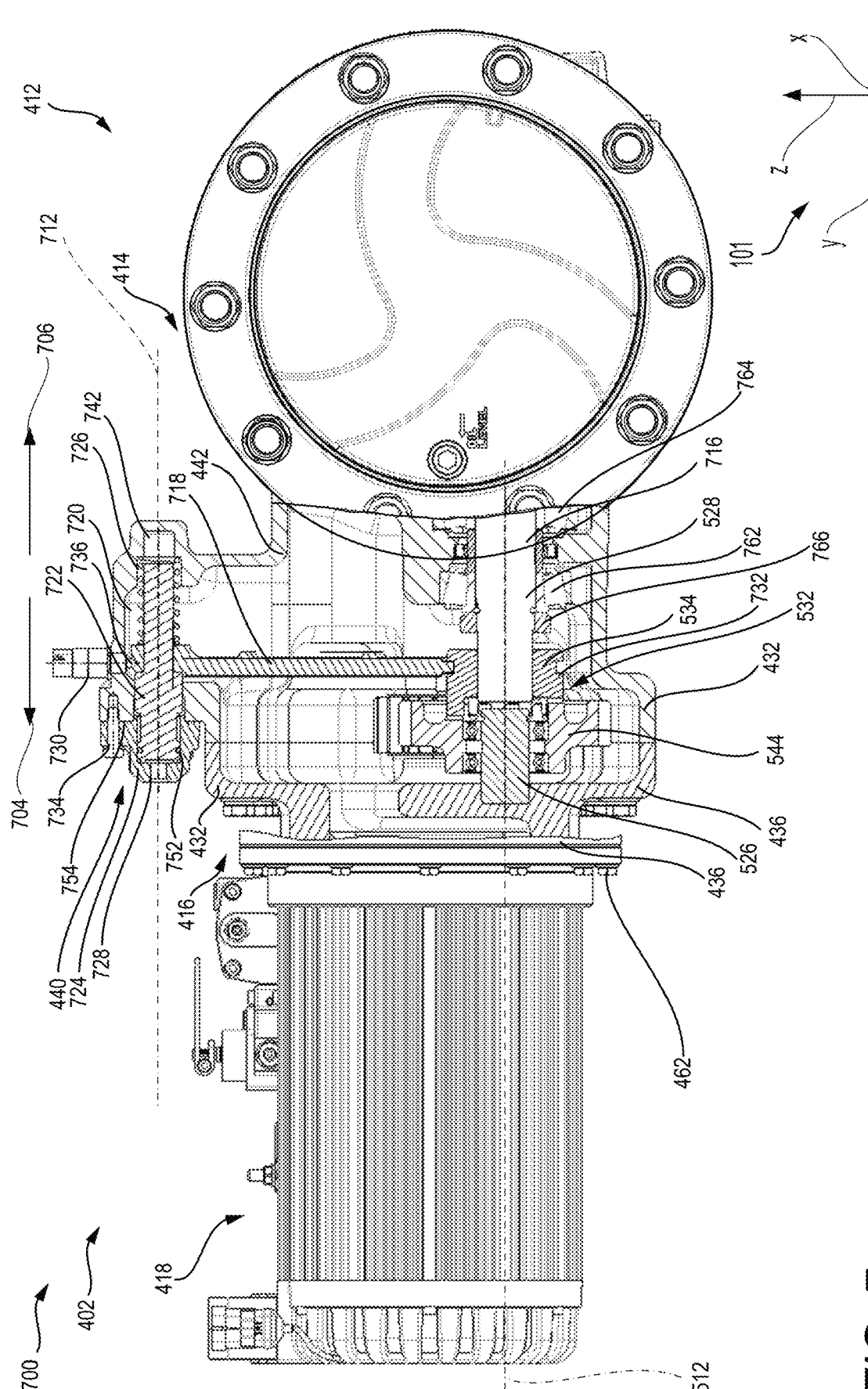
FIG. 7 shows a sectional view of the gearbox assembly.
Figure 8A:
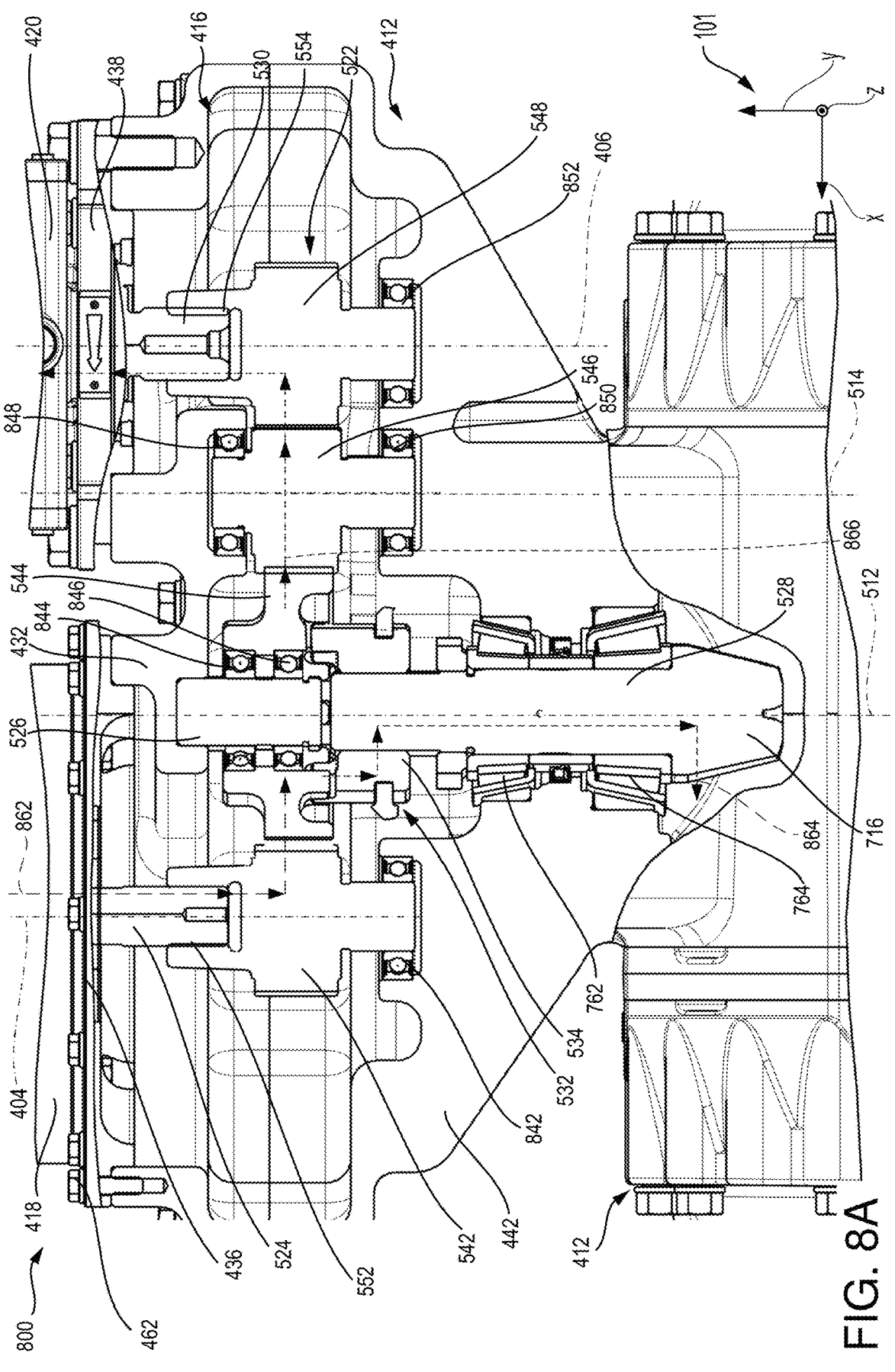
FIG. 8A shows a sectional view of the gearbox assembly where a disconnect clutch of the gearbox assembly is closed.
Figure 8B:
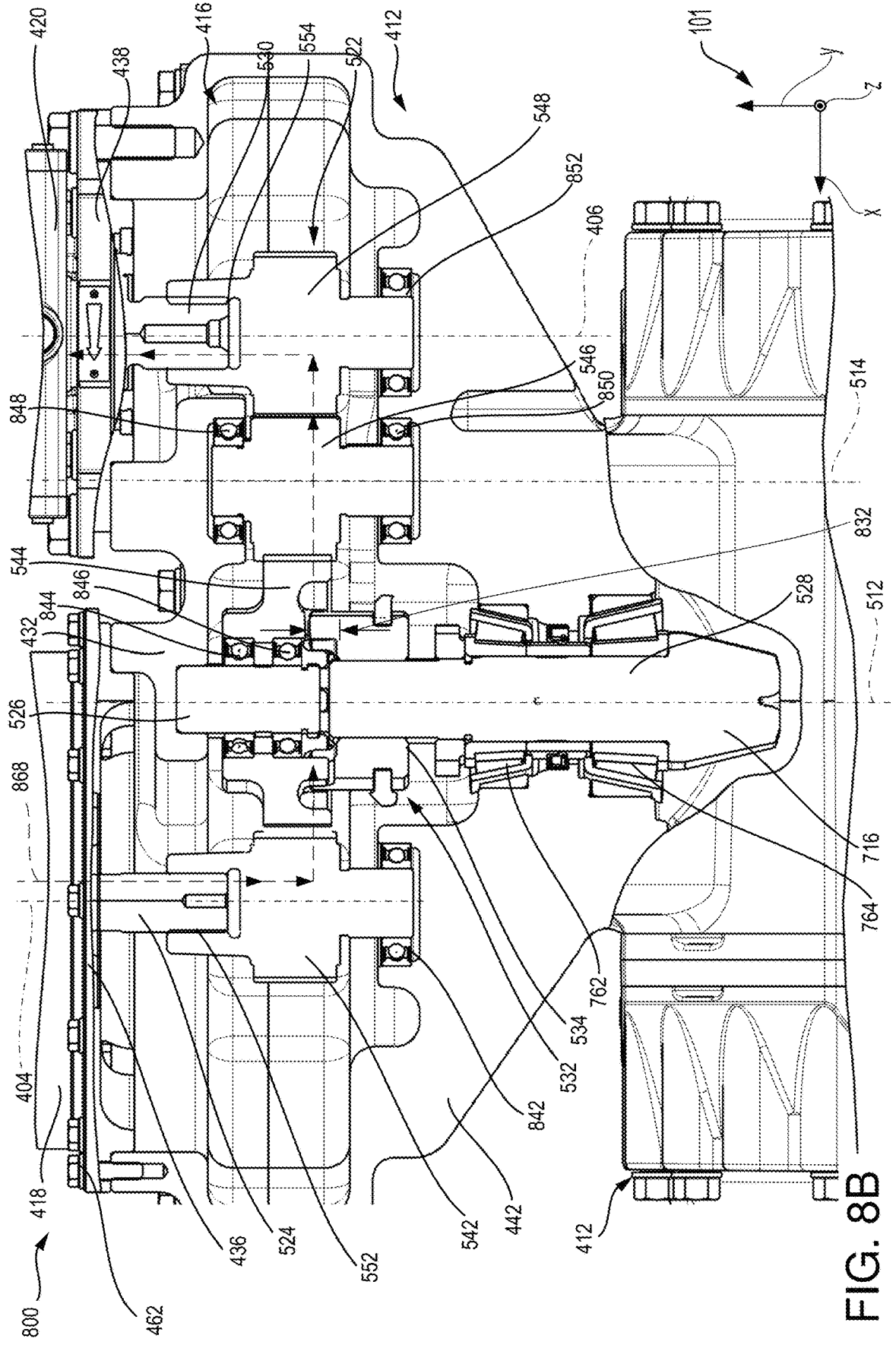
FIG. 8B shows a sectional view of the gearbox assembly where the disconnect clutch of the gearbox assembly is opened.

FIG. 1 shows a schematic of a vehicle with a vibratory roller. FIG. 2 shows a schematic of an electrified drive train for a driven axle which may be used with the vehicle of FIG. 1. FIG. 3 shows a block diagram for a system for a drive train of the vehicle of FIG. 1 including electrified and hydraulic components. At least an electric machine of the drive train may drive a first pump and a second pump via a gearbox of the driven axle. The first pump may drive a first hydraulic motor, and the first hydraulic motor may drive the vibratory roller. The second pump may drive a plurality of auxiliary elements. The first pump may drive a third hydraulic motor, where the third hydraulic motor may vibrate the vibratory roller. FIG. 4 shows a top view of a drive axle assembly, which may be used with the vehicle of FIG. 1. FIG. 5 shows sectional view of a gearbox assembly of FIG. 4. FIG. 6 shows a sectional view of the gearbox assembly of FIG. 4. FIG. 7 shows a sectional view of the gearbox assembly of FIG. 4. The gearbox assembly of FIGS. 4-7 includes an input gear, an intermediate gear, a PTO output gear, and a disconnect clutch, the disconnect clutch part of a larger disconnect assembly. The electric machine may fasten to the gearbox assembly and drive the input gear. The PTO output gear may drive a PTO device fastened to the gearbox assembly, where the PTO device may drive the first and/or second pump of FIG. 3. The intermediate gear may be selectively coupled via the disconnect clutch to a pinion gear that may drive the drive axle assembly. FIG. 8A shows a sectional view of the gearbox assembly where a disconnect clutch of the gearbox assembly is closed. When the disconnect clutch is closed, the gearbox may split rotary power from the input gear between the PTO output gear and the pinion gear. FIG. 8B shows a sectional view of the gearbox assembly where the disconnect clutch of the gearbox assembly is open. When the disconnect clutch is opened, the gearbox may deliver rotary power from the input gear to the PTO output gear.

It is to be understood that the specific assemblies and systems illustrated in the attached drawings, and described in the following specification are simply exemplary embodiments of the inventive concepts defined herein. For purposes of discussion, the drawings are described collectively. Thus, like elements may be commonly referred to herein with like reference numerals and may not be re-introduced.

FIGS. 1-3 shows a schematic of an example configuration with relative positioning of the various components. FIGS. 4-8B show example configurations with approximate positioning. FIGS. 4-8B are shown approximately to scale; though other relative dimensions may be used. As used herein, the terms "approximately" is construed to mean plus or minus five percent of the range unless otherwise specified.

Further, FIGS. 1-8B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified. Features described as tangential may extend linearly from a point on a circumference that is radially about an axis or a component or feature described prior as being radial to a referenced axis, unless otherwise specified.

Features described as longitudinal may be approximately parallel with an axis that is longitudinal. A lateral axis may be normal to a longitudinal axis and a vertical axis. Features described as lateral may be approximately parallel with the lateral axis. A vertical axis may be normal to a lateral axis and a longitudinal axis. The vertical axis may be relative to and parallel with the direction of gravity. Features described as vertical may be approximately parallel with a vertical axis.

FIG. 1 shows a first schematic 150 of a vehicle 100. The vehicle 100 may be a soil compactor. The vehicle 100 may have a first side 112 and a second side 114. The first side 112 may be the front or front side of the vehicle 100. Likewise, the second side 114 may be a rear or rear side of the vehicle 100. The vehicle 100 includes a drive axle 108 and a vibratory roller 140. The drive axle 108 may be a rear drive axle positioned nearest to a rear relative to a front of the vehicle 100. The vibratory roller 140 may be a front vibratory roller. The vehicle 100 includes a chassis 142. The chassis 142 may support the vibratory roller 140 and the drive axle 108. The drive axle 108 and the vibratory roller 140 may be affixed to the chassis 142, where the rotating elements of the drive axle 108 and vibratory roller 140 may rotate independently of the chassis 142. The drive axle 108 may drive the vehicle 100 in a direction.

A set of reference axes 101 are provided in FIG. 2 and in FIGS. 4-7. The reference axes 101 indicate a y-axis, an x-axis, and a z-axis. In one example, the z-axis may be parallel with a direction of gravity and the x-y plane may be parallel with a horizontal plane the vehicle 100 of FIGS. 1-2. A drive axle assembly 402 of FIG. 4, and a differential assembly 414 and a gearbox assembly 416 of FIG. 5 may rest upon.

FIG. 2 shows a second schematic 202 of an example of the vehicle 100. The second schematic 202 shows the vehicle 100 may have a third side 116 and a fourth side 118, the third side 116 opposite the fourth side 118. The third side 116 and the fourth side 118 may be separated by a vehicle centerline 119. The vehicle centerline 119 is parallel with the y-axis and may be a longitudinal axis.

The vehicle 100 is an electrified vehicle, including a drive train 102 that is electrified. The drive train 102 includes a driveline 103. The drive train 102 may be enclosed by a plurality of first dashed lines 152. Likewise, the driveline 103 may be enclosed by a plurality of second dashed lines 154. The vehicle 100 comprises an electric machine 126 and a power source 132. The electric machine 126 is a mover that may drive the vehicle 100. The electric machine 126 may be an electric motor or an electric motor/generator. The power source 132 is an energy storage device, such as a battery pack, and may include a traction battery. It is to be appreciated that the power source 132 may be rear mounted in the vehicle 100 relative to the drive train 102. For example, the power source 132 may be mounted closest to the second side 114 relative to the first side 112 of FIG. 1.

Likewise, the power source 132 may be mounted above or below the drive axle 108 of FIG. 1. The driveline 103 may comprise a first wheel 106a, a second wheel 106b, and a drive axle 108. Though the first wheel 106a and the second wheel 106b are shown in FIG. 1, it is noted that more wheels may be included in one or more examples. For one example, the vehicle 100 may comprise four or more wheels, including two or more front wheels that are to the front of the drive axle 108.

The drive axle 108 may be enclosed by a plurality of third dashed lines 156. The drive axle 108 may have a transmission 104, differential assembly 120, an axle shaft 124, and a plurality of final drives, including a first final drive 122a and a second final drive 122b. The electric machine 126 may rotatably couple to the transmission 104, such as to input a power flow to the transmission 104, such as via torque. The electric machine 126 may have an output shaft 111. The output shaft 111 may drivingly couple to the transmission 104, therein rotatably coupling and drivingly coupling the electric machine 126 to the transmission 104. The transmission 104 may be drivingly coupled to the drive axle 108 and supported by differential assembly 120. The differential assembly 120 may support and connect the axle shaft 124. The axle shaft 124 may support the first final drive 122a, the second final drive 122b, and a plurality of wheels, including a first wheel 106a and a second wheel 106b.

The electric machine 126 may be an electric motor or an electric motor generator. The electric machine 126 may be the prime mover of the vehicle 100. The mechanical energy provided by the electric machine 126 may be adjusted and controlled by the motor control unit (MCU) 134. The vehicle 100 also has a transmission 104. The driveline 103 comprises a first wheel 106a, a second wheel 106b, a drive axle 108, and similar components from FIG. 1. Energy may be stored in the power source 132 as chemical energy. The power source 132 converts chemical energy into electrical energy. The electrical energy may be transferred to the electric machine 126 from the power source 132. The vehicle 100 may be driven and operated such as to not produce emissions, such as greenhouse gases. The vehicle 100 may therein be referred to as a zero emission vehicle.

The power source 132 may be electrically coupled to a motor control unit 134 and the electric machine 126. A connection 138 may electrically couple components to the power source 132. In particular, the connection 138 electrically couples the power source 132, motor control unit 134, and the electric machine 126. For the example in FIG. 2, the motor control unit 134 may comprise and/or be electrically coupled to an inverter that may convert direct current (DC) from the power source 132 into alternating current (AC) for the electric machine 126. For other examples, there may be a separate inverter between the power source 132 and the motor control unit 134 along the connection 138 that converts DC current of the power source 132 to AC current for the motor.

Electrical energy from the power source 132 to the electric machine 126 may be adjusted and controlled by the motor control unit 134. The rotational speed and mechanical energy produced by the electric machine 126 may be adjusted and controlled by the motor control unit 134 and input from the transmission 104. Mechanical energy generated by the electric machine 126 may be transmitted to the transmission 104. The transmission 104 may transfer mechanical energy to the drive axle 108.

The electric machine 126 may generate a torque and transfer a power flow to the transmission 104 through the output shaft 111 via the torque. The transmission 104 may transfer the power flow to the differential assembly 120, the axle shaft 124, and the first and second wheels 106*a*, 106*b*, respectively. Therein, if the torque great enough to overcome the friction or other forces placed on the first and second wheels 106*a*, 106*b*, then the components of the differential assembly 120 and the axle shaft 124 may rotate. Therein, rotating the first and second wheels 106*a*, 106*b* with the axle shaft 124 and driving the vehicle 100 in a direction. Wherein, the differential assembly 120 may adjust the torque supplied to the first and second wheels 106*a*, 106*b* during a turn. Additionally, the first final drive 122*a* and second final drive 122*b* may adjust the torque supplied to the first wheel 106*a* and the second wheel 106*b*, respectively, for the weight of a load on vehicle 100.

The rotation of the output shaft 111 transfers mechanical energy into the differential assembly 120. A differential of the differential assembly 120 transfers mechanical energy from the output shaft 111 into the axle shaft 124. The mechanical energy may cause the axle shaft 124 to rotate. Depending on the rotation of the output shaft 111 and configuration of the differential assembly 120, the axle shaft 124 may rotate in the direction of the first side 112 or the second side 114. The rotation of the axle shaft 124 forces the wheels to rotate in a similar direction. If the vehicle 100 is turning, the third side 116 of the axle shaft 124 and the first wheel 106*a* are rotated at different rotational speeds from the fourth side 118 of the axle shaft 124 and the second wheel 106*b*, respectively. The first final drive 122*a*, second final drive 122*b*, and differential assembly 120 may change the rotational speed of the first wheel 106*a*, second wheel 106*b*, and different sides of the axle shaft 124 so the vehicle 100 may turn without slipping over a road surface and while reducing degradation to the driveline.

The first final drive 122*a* and second final drive 122*b* may reduce the speed of the axle shaft 124 by decreasing the RPM and increasing the torque. The first final drive 122*a* and second final drive 122*b* may allow for the vehicle 100 to move by increasing the torque on the output shaft 111. Additionally, the first final drive 122*a* and the second final drive 122*b* may help the vehicle 100 to turn while preventing slipping. The first final drive 122*a* on the third side 116 and second final drive 122*b* on the fourth side 118 may rotate at different speeds. The first and second final drives 122*a*, 122*b* may cause the third side 116 and fourth side 118 of the axle shaft 124 to rotate at different rotational speeds. Likewise, the first and second final drives 122*a*, 122*b* may cause the first wheel 106*a* and second wheel 106*b* to rotate at different rotational speeds. The first final drive 122*a* and second final drive 122*b* may each comprise a single planetary gear assembly or of a plurality of planetary gear assemblies.

Turning to FIG. 3, it shows a drive train system 300 of the present disclosure schematically as a block diagram. The vehicle 100 of FIGS. 1-2 may comprises the drive train system 300, and the driveline system may include the drive train 102 and the driveline 103 of FIG. 2. The drive train system 300 and the drive train 102 are surrounded by the first dashed lines 152.

The drive train system 300 may output power via hydraulic pumps to hydraulic mover components and other consumers via a plurality of first hydraulic lines 316 and a plurality of second hydraulic lines 318. The first hydraulic lines 316 are part of a first hydraulic circuit. The second hydraulic lines 318 are part of a second hydraulic circuit. The drive train system 300 also includes an electrical system that may flow electricity between electrified components via electrical couplings 320.

The electrical couplings 320 may electrically couple the power source 132, to an MCU/Inverter assembly 322, and the MCU/Inverter assembly 322 to the electric machine 126. The MCU/Inverter assembly 322 may include the motor control unit 134 of FIG. 2 and one or more of a plurality of inverters. The inverter or inverters of the MCU/Inverter assembly 322 may be configured to adjust direct current (DC) to alternating current (AC), such as adjusting direct current from the power source 132 into alternate current to the electric machine 126. The electric machine 126 may rotatably couple a first gearbox 324, such as to drive the first gearbox 324 via rotary power, such as via a torque. The first gearbox 324 may drivingly couple and output rotational energy to the drive axle 108. Rotatably and drivingly coupling the electric machine 126 to the drive axle 108 via the first gearbox 324 may make the drive train system 300 more compact and reduce a volume of packing space compared to a driveline of the art: for example, a drive train system with a hydraulic motor that may drive the drive axle 108 in place of the electric machine 126. Additionally, the electric machine 126 may be mounted to the drive axle 108, such as via being mounted to the first gearbox 324. The first gearbox 324 may therein reduce the volume and area taken up by the drive train system 300, such as below a threshold for a desired packing space and an architecture of the chassis 142 of FIG. 1. The first gearbox 324 may be or be a part of the transmission 104 of FIG. 2.

Drivingly coupling the drive axle 108 and the first gearbox 324 to the electric machine 126 makes a more compact architecture for the drive train system 300. For example, the first gearbox 324 may reduce the quantity of power electronic components, such as via eliminating a separate motor and a separate inverter for each auxiliary drive unit. Additionally, the first gearbox 324 allows the drive train system 300 to drive the drive axle 108 and the auxiliary systems while the vehicle 100 lacks an internal combustion engine (ICE), a steam engine, or a non-electrified mover. Further, the first gearbox 324 may allow the drive train system 300 to drive the drive axle 108 while lacking a hydraulic transmission system that includes a hydraulic pump and a hydraulic motor to drive the drive axle 108.

A vibration pump 334 may be drivingly coupled to the first gearbox 324, such that rotary power input to the first gearbox 324 may drive the vibration pump 334. The electric machine 126 may be drivingly coupled to the vibration pump 334 via the first gearbox 324, such that rotary power from the electric machine 126 may drive the vibration pump 334. Additionally, the vibration pump 334 may be mounted to the drive axle 108, such as via being mounted to a housing of the first gearbox 324. The electric machine 126 and the vibration pump 334 may be mounted in a longitudinal direction relative to the vehicle 100 or another vehicle housing the drive train system 300.

By direct mounting the electric machine 126 and/or the vibration pump 334 to the drive axle 108, the drive train 102 of the drive train system 300 may be more compact and robust compared to driveline systems using hydraulic motors to drive the drive axle 108. The mounting of the electric machine 126 and/or vibration pump 334 to the drive axle may increase packing space for the vehicle 100, specifically packing space the rear side of the vehicle 100. The increased packing space via mounting the electric machine 126 and vibration pump 334 to the drive axle, may allow for rear mounting of the power source 132 to the vehicle 100, such as to the rear of the chassis 142 of FIG. 1. Further, when the power source 132 of the vehicle 100 is rear mounted, packing space available for the vehicle 100 may be further increased. The increasing of packing space to the vehicle via the mounting of the electric machine 126 and/or the vibration pump 334 to the drive axle 108 and the rear mounting of the power source 132, may increase packing space for the vibratory roller 140, allowing for the vibratory roller 140 to have a larger diameter.

The vibration pump 334 is part of the first hydraulic circuit and are fluidly coupled with the first hydraulic lines 316. The vibration pump 334 may flow hydraulic fluid, hydraulic pressure, and hydraulic power to a vibration motor 332 and a hydraulic motor 336 via the first hydraulic circuit. The second gearbox 338 may be driven by hydraulic motor 336 and output rotational energy to drive the vibratory roller 140. The first gearbox 324 may drivingly couple and transfer rotational energy to drive the steering pump 342, such as via the vibration pump 334. For example, the vibration pump 334 and the steering pump 342 may be configured in a tandem pump arrangement, wherein both pumps are driven by the same shaft. Further, a larger tandem pump may comprise the vibration pump 334 and the steering pump 342. The vibration pump 334 and the steering pump 342 are hydraulic pumps, that may flow hydraulic fluid and hydraulic power to drive hydraulic motors and drive other components for auxiliary processes of the drive train system 300.

The first gearbox 324 may selectively couple to the drive axle 108 via a disconnect 326. When coupled, the disconnect 326 may allow the electric machine 126 to drive the drive axle 108, the vibration pump 334, and the steering pump 342 via the first gearbox 324. When decoupled, the disconnect 326 allows the electric machine 126 to drive the vibration pump 334 and the steering pump 342 via the first gearbox 324. The vibration pump 334 and steering pump 342 may drive a plurality of auxiliary devices and auxiliary functions via the auxiliary devices.

The drive train system 300 and the drive train 102 includes a vibratory roller system. The vibratory roller system includes the vibratory roller 140, a hydraulic motor 336, and a vibration motor 332. The hydraulic motor 336 may rotatably and drivingly couple to the vibratory roller, such as to drive the vibratory roller 140. Likewise, the vibration motor 332 may be vibrationally coupled to the vibratory roller 140, such that the vibration motor 332 vibrates the vibratory roller 140. As described herein, vibrationally coupled or vibrationally coupling refers to a first component coupled to and configured with a second component, such that the first component may vibrate the second component. The vibratory roller system may also include a reduction assembly that may drivingly couple the hydraulic motor 336 to the vibratory roller 140. For example, a second gearbox 338 may drivingly couple the hydraulic motor 336 to the vibratory roller 140. Said in another way, the hydraulic motor 336 may drivingly couple to the second gearbox 338, such as to transfer rotary power to the second gearbox 338. The second gearbox 338 may drivingly couple to the vibratory roller 140, such as to transfer rotary power to and drive the vibratory roller 140. Rotary power may be transferred between the hydraulic motor 336, the second gearbox 338, and the vibratory roller 140 via torque.

When driven, the vibration pump 334 may generate a pressure differential for the first hydraulic lines 316. The vibration motor 332 may vibrate the vibratory roller 140. The hydraulic motor 336 may be a roller drive motor and output rotary power to drive the vibratory roller 140. The hydraulic motor 336 may transfer rotary power to drive the second gearbox 338, and the second gearbox 338 may transfer rotary power to drive the vibratory roller 140. The second gearbox 338 may alter torque input to output a different torque, where the second gearbox 338 may increase the torque to the vibratory roller 140 from the hydraulic motor 336.

The steering pump 342 and the second hydraulic lines 318 may be part of a second hydraulic circuit. The steering pump 342 may flow hydraulic fluid, hydraulic pressure, and hydraulic power to a ventilator motor 344 via the second hydraulic circuit. The ventilator motor 344 is a hydraulic motor. The ventilator motor 344 may power at least an auxiliary device including a steering cylinder 352, a crab walk cylinder 354, a cylinder edge cutter 356, or a cylinder chip spreader 358. Additionally, the ventilator motor 344 may drive a plurality of auxiliary implements including the steering cylinder 352, the crab walk cylinder 354, the cylinder edge cutter 356, and/or the cylinder chip spreader 358. The steering cylinder 352, the crab walk cylinder 354, the cylinder edge cutter 356, and the cylinder chip spreader 358 may be used for auxiliary functions such as steering the vehicle 100, crab walking the vehicle 100, removing buildup of soil and other particulates from the edges of the vibratory roller 140, and spreading aggregate, respectively. Additionally, the ventilator motor 344 may drive devices that spray fluid, including one or more sprinklers.

The electric machine 126 may be the only electric motor or mover to drive a plurality of auxiliary devices of the drive train 102, such as the steering cylinder 352, the crab walk cylinder 354, the cylinder edge cutter 356, and the cylinder chip spreader 358. Likewise, at least an inverter of the MCU/inverter assembly 322 may be the only inverter to deliver electric power to the electric machine 126 and drive the auxiliary devices of the drive train 102. Said in another way, the arrangement of drive train system 300 may prevent additional electric motors and inverters, e.g., separate from the electric machine 126 and the inverter or inverters of the MCU/inverter assembly 322, driving auxiliary functions of the drive train 102.

In this way, the disclosed system provides for an electrified drive train configuration for a vehicle with a vibratory roller. The electrified drive train incorporates an electric motor that may drive components using rotational power and hydraulic power via a gearbox. The electric motor may drive the PTO assembly via the gearbox. The gearbox is an integrated gearbox for an axle assembly. The electric motor and a PTO assembly may be mounted and drivingly coupled to the gearbox. The PTO assembly may drive a first pump and a second pump. The first pump and the second pump may be in a tandem configuration and may drive auxiliary functions of the vehicle. The electrified drive train includes a vibrational motor and a roller drive motor that may vibrate and drive the vibratory roller, respectively. The first pump may hydraulically power the vibrational motor and the roller drive motor. Likewise, second pump may hydraulically power a plurality of consumers for functions of the vehicle, such as for steering, crab walking, edge cutting, and chip spreading.

Turning to FIG. 4, it shows a first view 400 of the drive axle assembly 402. The drive axle assembly 402 may include the drive axle 108 of FIGS. 1-3. First view 400 shows a first axis 404, a second axis 406, and a third axis 408. The first and second axes 404, 406 may be longitudinal axes relative to a vehicle housing the drive axle assembly 402. The third axis 408 may be a lateral axis relative to the vehicle housing the drive axle assembly 402.

The drive axle assembly 402 comprises a drive axle 412, a differential assembly 414, and a gearbox assembly 416. The drive axle 412 may comprise the differential assembly 414, and the differential assembly 414 may comprise the gearbox assembly 416. The drive axle 412 may be a rear drive axle. An electric machine 418 and a PTO device may be mounted to the drive axle assembly 402 via the gearbox assembly 416. The electric machine 418 and the PTO device may be drivingly coupled to the gearbox assembly 416. More specifically, the electric machine 418 and PTO device may be alongside each other and attached to the gearbox assembly 416. More specifically, the electric machine 418 may be centered about the first axis 404, and the PTO device may be centered about the second axis 406. The electric machine 418 therein may be mounted in a longitudinal direction relative to the vehicle 100 or another vehicle housing the drive axle assembly 402. The first axis 404 may be a rotational axis for the electric machine 418, that rotating elements of the electric machine 418 may rotate or spin radially around. For example, the rotor of the electric machine 418 may spin radially around the first axis 404. Likewise, the second axis 406 may be a rotational axis for the PTO device, that rotating elements of the PTO device may rotate or spin radially around. For example, a PTO link of the PTO device may spin radially around second axis 406. The PTO device therein may be mounted in a longitudinal direction relative to the vehicle 100 or another vehicle housing the drive axle assembly 402.

The gearbox assembly 416 may be an integrated gearbox assembly with an integrated gearbox part of the differential assembly 414. The electric machine 418 may be electric motor or an electric motor generator. The electric machine 418 may be the electric machine 126 of FIGS. 2-3. For example, the PTO device may be a hydraulic pump assembly 420, and the PTO device may be referred to herein as the hydraulic pump assembly 420. The hydraulic pump assembly 420 may be or comprises at least a hydraulic pump. Further, the hydraulic pump assembly 420 be a tandem pump that comprises two or more pumps, such as the vibration pump 334 and the steering pump 342 of FIG. 3. For another example, the hydraulic pump assembly 420 may be part of a larger tandem pump assembly, where the hydraulic pump assembly 420 may be or include the vibration pump 334 or steering pump 342 and share a common shaft with another pump assembly that includes the steering pump 342 or the vibration pump 334, respectively. The hydraulic pump assembly 420 comprises or drivingly couples to a PTO link. The PTO link may drivingly couple to the gearbox assembly 416.

The drive axle assembly 402 includes a first hub assembly 422 and a second hub assembly 424. The first hub assembly 422 and the second hub assembly 424 may each drivingly couple to a wheel. The first hub assembly 422 may rigidly couple to a first axle shaft housed by a first axle housing 426. The second hub assembly 424 may rigidly couple to a second axle shaft housed by a second axle housing 428. The differential system of the differential assembly 414 may be drivingly couple to the first axle shaft and the second axle shaft, where the differential assembly 414 may drive first shaft at a different power and a different rotational speed from the second axle shaft. For example, the first hub assembly 422 may drivingly couple to the first wheel 106a of FIG. 2. Likewise, the second hub assembly 424 may drivingly couple to the second wheel 106b of FIG. 2. Both first wheel 106a and second wheel 106b may rotate with different power and different speed.

The gearbox assembly 416 includes a gearbox housing 430 and a first cover 432. The gearbox assembly 416 may include a first input 436 and a second input 438. Rotary power may be transferred, such as via torque, to and from the gearbox of the gearbox assembly 416 via the first input

436 and the second input 438. The first cover 432 may include the first input 436 and the second input 438. The electric machine 418 may drivingly couple to the first input 436, such as to drive the first input 436. The electric machine 418 may mount to first cover 432 and input torque to the gearbox assembly 416 via the first input 436. The electric machine 418 may drivingly couple to the gearbox assembly 416 via the first input 436. The hydraulic pump assembly 420 may drivingly couple to the second input 438, such as to be driven by the second input 438. The hydraulic pump assembly 420 may mount to first cover 432 and receive torque from the gearbox assembly 416 via the second input 438. Said in another way, the second input 438 may be the PTO link for the hydraulic pump assembly 420. The first input 436 may be centered radially around the first axis 404, where the first axis 404 may be a rotational axis that the first input 436 may spin radially around. Likewise, the second input 438 may be centered radially around the second axis 406, where the second axis 406 may be a rotational axis that the second input 438 may spin radially around. The side of the gearbox assembly 416 where the electric machine 418 mounts may be referred to herein as a motor side.

For an example, a plurality of first fasteners 462 may mount the electric machine 418 to the first input 436. Likewise, a plurality of second fasteners 464 may mount the hydraulic pump assembly 420 to the second input 438. A plurality of third fasteners 466 may fasten and mount the first cover 432 to the gearbox housing 430.

The differential assembly 414 includes a differential housing 442. The differential housing 442 may house the differential of the differential assembly 414. The differential housing 442 may be and be alternatively referred to herein as a differential carrier 442. The differential carrier 442 may comprise the gearbox housing 430. For example, the gearbox assembly 416 may be an integrated gearbox assembly of the differential carrier 442 with an integrated gearbox. As such, the differential carrier 442 may comprise the gearbox housing 430.

The gearbox assembly 416 also includes a disconnect feature 440. The disconnect feature 440 may be or include the disconnect 326 of FIG. 3. The disconnect feature 440 is a disconnect assembly that that may shift a disconnect clutch for selectively coupling rotating elements of a gear train housed by the gearbox housing 430 and differential carrier 442.

Turning to FIG. 5 it shows a second view 500 of the differential assembly 414 and the gearbox assembly 416, where the differential assembly 414 and gearbox assembly 416 are shown separate from other components of the drive axle 412. The second view 500 is a sectional view (e.g., a cross-section view). The second view 500 is from a top perspective (e.g., looking downward along the z-axis of the reference axes). The second view 500 shows a gear train 522 of the gearbox assembly 416. The differential may be sectioned by a first line 504 and a second line 506. The first line 504 is lateral, and the second line 506 is longitudinal. A sectional view may be taken on the first line 504 and the second line 506, where a first view plane for a first sectional view includes the first line 504 and a second view plane for a second sectional view includes the second line 506. The second view 500 shows a fourth axis 512 and a fifth axis 514. The fourth and fifth axes 512, 514 may be longitudinal axes relative to the vehicle housing the drive axle assembly 402. Components and features of the gearbox assembly 416, including components and features of the gear train 522, may be centered around the fourth and fifth axes 512, 514.

The gear train 522 includes and drivingly couples to a plurality of shafts, including a first shaft 524, a second shaft 526, a third shaft 528, and a fourth shaft 530. The first shaft 524 may be an input shaft to the gear train 522. The first shaft 524 may be a motor shaft, where an output for the electric machine 418 comprises or rigidly couples to the first shaft 524. The second shaft 526 may be an intermediate shaft. The third shaft 528 may be first output shaft from the gear train 522. The third shaft 528 may drivingly couple to the differential assembly 414. The fourth shaft 530 may be a second output shaft from the gear train 522. The fourth shaft 530 may drivingly couple to the hydraulic pump assembly 420.

The first shaft 524 may be centered radially around the first axis 404, where the first axis 404 may be a rotational axis for the first shaft 524. The second shaft 526 may be centered radially around the fourth axis 512, where the fourth axis 512 may be a rotational axis for the second shaft 526. The third shaft 528 be centered radially around the fourth axis 512, where the fourth axis 512 may be a rotational axis for the third shaft 528. The fourth shaft 530 may be centered radially around the second axis 406, where the second axis 406 may be a rotational axis for the fourth shaft 530. Said in another way, the first shaft 524, the second shaft 526, the third shaft 528, and the fourth shaft 530 may spin around the first axis 404, the fourth axis 512, the fourth axis 512, and the second axis 406, respectively.

The gear train 522 and third shaft 528 may be selectively coupled via a clutch 532. The clutch 532 is a disconnect clutch for the disconnect feature 440. The clutch 532 includes a locking component that may selectively couple rotating elements of the gear train 522 to the third shaft 528, such that the gear train may drive the third shaft. For example, the clutch 532 may comprise a clutch gear 534, where the clutch gear 534 is the locking component. The clutch gear 534 may rigidly couple to the third shaft 528. More specifically, the clutch gear 534 may rigidly couple the third shaft 528 via a spline connection, where a plurality of first splines of the clutch gear 534 and a plurality of second splines of the third shaft 528 mate.

The gear train 522 includes a plurality of gears, such as a first gear 542, a second gear 544, a third gear 546, and a fourth gear 548. The first gear 542 may be an input gear to the gear train 522. The second gear 544 may be an intermediate gear for the gear train 522. The third gear 546 may be an idler gear for the gear train 522. The fourth gear 548 may be an output gear (e.g., the PTO output gear) for the gear train 522. The first gear 542 may mesh with the second gear 544; the second gear 544 may mesh with the third gear 546; and, the third gear 546 may mesh with the fourth gear 548.

It is to be appreciated, that different gear ratios may be achieved by altering the gearbox assembly 416 and, more specifically, gear train 522. For example, the pitch diameters may be increased for the first gear 542, the second gear 544, the third gear 546, and/or the fourth gear 548 to increase the ratio of the gear train 522. For another example, the pitch diameters may be decreased for the first gear 542, the second gear 544, the third gear 546, and/or the fourth gear 548 to decrease the ratio of the gear train 522. It is also to be appreciated, that the gear train 522 is non-limiting, and various configurations may be used that include at least the first gear 542, the second gear 544, and the fourth gear 548. For example, another configuration of a gear train of the present disclosure may lack the third gear 546, and the second gear 544 may mesh with the fourth gear 548. For another example, there may be one or more gears interposed between the first gear 542 and the second gear 544 that may mesh with the first gear 542 and/or second gear 544. For this or another example, there may be one or more gears interposed between the second gear 544 and the third gear 546 that may mesh with the second gear 544 and/or the third gear 546. For these or other examples, there may be one or more gears interposed between the third gear 546 and the fourth gear 548 that may mesh with the third gear 546 and/or the fourth gear 548.

The clutch gear 534 may selectively couple to the second gear 544, such as via closing the clutch 532 and shifting the disconnect feature 440 of FIG. 4. When selectively coupled via the clutch 532 the second gear 544 and the third shaft 528 may rotate/spin as a unitary shaft. The clutch gear 534 may slide on the second splines of the third shaft 528 in axial direction with respect to fourth axis 512 to engage or dis-engage with the second gear 544. For example, the second gear 544 have a plurality of first teeth for a locking purpose. Likewise, the clutch gear 534 may have a plurality of second teeth for the locking purpose. The first teeth may rigidly couple to a first face of the second gear 544. The second teeth may rigidly couple to a second face of the clutch gear 534. When the clutch gear 534 and the second gear 544 selectively couple, the first teeth and second teeth may mesh, locking the clutch gear 534 to the second gear 544.

The first gear 542 may have a first opening 552. Likewise, the fourth gear 548 may have a second opening 554. The first opening 552 and the second opening 554 may each be a socket for their respective gear. The first opening 552 may receive the first shaft 524. When received by the first opening 552, the first shaft 524 may rigidly couple the first gear 542. The first shaft 524 may rigidly couple the first gear 542 via a spline connection, where splines of the first shaft 524 and splines of the first gear 542 mate. Likewise, the second opening 554 may receive the fourth shaft 530. When received by the second opening 554, the fourth shaft 530 may rigidly couple the fourth gear 548. The fourth shaft 530 may rigidly couple the fourth gear 548 via a spline connection, wherein splines of the fourth shaft 530 and splines of the fourth gear 548 mate.

Turning to FIG. 6, it shows a third view 600 of the gearbox assembly 416. The third view 600 is as sectional view. The third view 600 is point of view from motor side, where the y-axis is positive to the view. The third view 600 is taken on the first line 504 of FIG. 5. The third view 600 shows the first axis 404, the second axis 406, the fourth axis 512, and the fifth axis 514 may be at different heights, with respect to the z-axis.

The gearbox housing 430 includes a cavity 622. The cavity 622 may surround and house the gear train 522. The first gear 542 may be centered radially around the first axis 404, where the first axis 404 may be a rotational axis for the first gear 542. The second gear 544 may be centered radially around the fourth axis 512, where the fourth axis 512 may be a rotational axis for the second gear 544. The third gear 546 may be centered radially around the fifth axis 514, where the fifth axis 514 may be a rotational axis for the third gear 546. The fourth gear 548 may be centered radially around the second axis 406, where the second axis 406 may be a rotational axis for the fourth gear 548. Said in another way, the first gear 542, the second gear 544, the third gear 546, and the fourth gear 548 may spin radially around the first axis 404, the fourth axis 512, the fifth axis 514, and the second axis 406, respectively.

The gearbox housing 430 includes a plurality of first holes 632. The third fasteners 466 of FIG. 4 may extend through the holes 632. The first cover 432 may be fastened to the gearbox housing 430 via the third fasteners 466 and the first holes 632. For example, a plurality of first fastening features, such as threading, may extend inward from the gearbox housing toward and face the first holes 632. The third fasteners 466 may comprise a plurality of second fastening features that may mate with the first fastening features, therein fastening the third fasteners 466 to the first holes 632.

Turning to FIG. 7, it shows a fourth view 700 of the differential assembly 414 and the gearbox assembly 416. The fourth view 700 is a sectional view. The fourth view 700 shows a sixth axis 712. The sixth axis 712 may be longitudinal axis. Components of the disconnect feature 440 may be centered about and translated along the sixth axis 712. Components of the disconnect feature 440 may be translated in directions parallel with the sixth axis 712. More specifically, components of the disconnect feature 440 may be translated in a first direction 704 or a second direction 706 parallel with the sixth axis 712, and therein may be longitudinal and horizontal directions. The first direction 704 is opposite the second direction 706. The first direction 704 and the second direction 706 may be represented via arrows.

The differential assembly 414 may include and drivingly couple to a pinion gear 716. The third shaft 528 may comprise or rigidly couple to a pinion gear 716. The pinion gear 716 is an input that may drivingly couples to the drive axle 412 via the differential of the differential assembly 414. For example, the pinion gear 716 may mesh with a crown gear of the differential of the differential assembly 414. Various driveline ratios can be achieved by increasing or decreasing the ratios between pinion gear 716 and crown gear. For example, the driveline ratio may be increased by increasing the pitch diameter of the pinion gear 716 and/or the crown gear. Likewise, the driveline ratio may be decreased by decreasing the pitch diameter of the pinion gear 716 and/or the crown gear.

The disconnect feature 440 may be housed via the differential carrier 442. The disconnect feature 440 is a disconnect assembly that includes: a fork 718, a piston 722, a second cover 724, a spring 726, a switch 730, the third shaft 528, the pinion gear 716 and the clutch 532, where the clutch 532 includes the clutch gear 534 the second gear 544. The differential carrier 442 may include a cavity 720, where the piston 722 and the spring 726 are positioned within (or partially fill) the cavity 720. The piston 722 and spring 726 may be centered on the sixth axis 712, such as to be positioned radially around. The fork 718 is a shift fork for the disconnect feature 440. The spring 726 may be a return spring for the piston 722. The spring 726 may be positioned radially about the piston 722, and the spring 726 may be sandwiched between the fork 718 and the differential carrier 442. More specifically, the spring 726 is in between the fork 718 and a differential carrier hole 742. The spring 726 may abut the fork 718 and the differential carrier 442, pressing against the fork 718, the piston 722, and the differential carrier 442. The second cover 724 may be affixed to the gearbox housing 430 and the differential carrier 442, where the second cover 724 is opposite the spring 726 and the differential carrier hole 742 with respect to the piston 722. The second cover 724 is a piston cover, that may cover and surround at least a portion of the piston 722. The second cover 724 may cover the cavity 720, separating the cavity 720 from packing space surrounding the drive axle assembly 402. The fork 718 may be rigidly coupled to the piston 722, such that the translation of the piston 722 along the sixth axis 712 may shift the fork 718 in a direction parallel with the sixth axis 712. The fork 718 may extend downward from piston 722 and may be shiftingly coupled to the clutch 532, such that the clutch 532 may change states with the shifting of the fork 718. More specifically, the fork 718 may rigidly couple to the clutch gear 534. A first end of the fork 718 may rigidly couple to the piston 722, and a second end of the fork 718 may couple to the clutch gear 534, where the first end and the second end are opposite ends. To rigidly couple the clutch gear 534, the fork 718 may be fixed inside a slot 732 provided by the clutch gear 534. The clutch gear 534 may be fixed on the third shaft and/or pinion gear 716 via a spline connection.

The second cover 724 may be fixed and physically coupled to the differential carrier 442 via a plurality of fasteners 734. The second cover 724 may be a piston cover for the piston 722. The second cover 724 therein may enclose the piston 722 and spring 726 in the cavity 720, such as when the second cover 724 is fixed and physically coupled to the differential carrier 442. The second cover 724 comprises a port 728. The port 728 may be a hydraulic fluid port via which fluid, such as hydraulic fluid, may enter the cavity 720. Hydraulic fluid from the port 728 may actuate the piston 722 via translation.

For example, hydraulic pressure may be applied on the piston 722 through the port 728 for movement of the piston 722 and by extension the fork 718. An actuation chamber may be arranged between piston 722 and the port 728 that may expand or contract as the piston 722 is translated further or closer, respectively, to the port 728. As pressure is increased above a first threshold, the force of hydraulic pressure on the piston 722 becomes greater than the spring force of the spring 726. The spring 726 may compress in the second direction 706, and the piston 722 and the fork 718 may be translated in the second direction 706. Translation of the piston 722 and the fork 718 in the second direction 706, translates the clutch gear 534 away from the second gear 544 in the second direction. After the clutch gear 534 is translated a distance past a second threshold in the second direction 706, the clutch 532 may open. When the clutch 532 opens, the clutch gear 534 unlocks from the second gear 544, and the third shaft 528 and the pinion gear 716 may selectively decouple from the second gear 544. As the return spring for the disconnect feature 440, the spring 726 is used to reinstate the position of the piston 722 and the fork 718. To close the clutch 532 and lock the clutch gear 534 with the second gear 544, hydraulic pressure is removed between the second cover 724 and the piston 722 to at or below the first threshold. The spring 726 may expand in the first direction 704, and the spring force of the spring 726 may push the piston 722 and fork 718 back to their initial position.

The switch 730 may send electronic signals to a hydraulic actuation system that supplies hydraulic fluid to the port 728. More specifically, the switch may be communicatively coupled to and send electronic signals to a control system for the hydraulic actuation system supplying hydraulic fluid to the port 728. The switch 730 may be a solenoid switch. The switch 730 includes a contacting component 736. The contacting component 736 may mate with a feature of the fork 718, such as a hole or another opening. Additionally or alternatively, the piston 722 may have another feature that the contacting component 736 may be mated to. The movement of the fork 718 and/or piston may push the contacting component 736 upward from the feature or the another feature via translation or other motion. The pushing of the contacting component 736 may cause the switch 730 send signals to components of a control system including a controller for the hydraulic system. Upon receiving the signals from the switch 730, the controller processes the received signals, and employs various actuators to adjust pressure based on the received signals and instructions stored on the memory of controller. The controller may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. Depending on the operation and the instructions on the controller, the controller may adjust valves and other actuators of the hydraulic system to increase or decrease pressure to the port. For example, the switch 730 may send a signal to the controller and the control system, and the controller and control system may reduce hydraulic pressure to the port 728, such as to prevent over pressurization between the port 728 and the piston 722. For another example, the switch 730 may send a signal to the controller and the control system, and the controller and control system may increase the hydraulic pressure to the port 728, such as to prevent the returning of the piston and the fork to a start position below a threshold of time.

The disconnect feature 440 may also comprise a first seal 752 and a second seal 754. The first seal 752 may be sandwiched radially between the second cover 724 and the piston 722. The first seal 752 may be assembled in and fit to a groove of the piston 722. The first seal 752 is a piston seal that may fluidly seal the piston 722 with a housing features including the second cover 724. The second seal 754 is assembled in-between the second cover 724 and a mating face of the differential carrier 442. The second seal 754 may be sandwiched axially along the sixth axis 712 between second cover 724 and the differential carrier 442, such as between the second cover 724 and the gearbox housing 430. The second seal 754 may be an O-ring seal.

The third shaft 528 and the pinion gear 716 may be supported by a first bearing assembly 762 and a second bearing assembly 764. The first bearing assembly 762 and the second bearing assembly 764 may be positioned around the third shaft 528. More specifically, the first bearing assembly 762 and the second bearing assembly 764 may be radially around the third shaft 528. The first bearing assembly 762 and the second bearing assembly 764 may each contain one or more bearings, that may be referred alternatively herein to as pinion gear bearings. For example, the pinion gear bearings of the first bearing assembly 762 and the second bearing assembly 764 may be roller bearings, and, more specifically, taper roller bearings. The first bearing assembly 762 and the second bearing assembly 764 may be fixed in place via a lock nut 766. The lock nut 766 may fasten to the third shaft 528 and/or the pinion gear 716. The lock nut 766 may retain the first bearing assembly 762 and the second bearing assembly 764 interposed between the pinion gear 716 and the clutch gear 534. The lock nut 766 may prevent movement of first bearing assembly 762 and the second bearing assembly 764 in an axial direction along fourth axis 512. For example, the lock nut 766 may prevent movement of the first bearing assembly 762 and the second bearing assembly 764 in the first direction 704. The first bearing assembly 762 and the second bearing assembly 764 may allow the third shaft 528 and the pinion gear 716 to rotate/spin independently of the differential carrier 442 and gearbox housing 430.

Turning to FIG. 8A and FIG. 8B, it shows a fifth view 800 of the differential assembly 414 and the gearbox assembly 416. The fifth view 800 is a sectional view, where the fifth view 800 may be taken on the same view plane as the second view 500 of FIG. 5.

FIG. 8A shows disconnect feature 440 shifted such that the clutch 532 closed. More specifically, in FIG. 8A the clutch gear 534 is engaged such as to mesh and selectively couple to the second gear 544. FIG. 8A shows a power flow represented by a plurality of first arrows 862. The power flow may be split into a first branch and a second branch at the clutch 532. The first branch represented by a plurality of second arrows 864, and the second branch represented by a plurality of third arrows 866. Following the first arrows 862, the electric machine 418 drives the first input 436 and the first shaft 524. The first gear 542 is driven with the first shaft 524, and the first gear 542 drive the second gear 544. Rotary power may be split at the second gear 544 by the clutch 532 into the first branch and the second branch. Following the second arrows 864, the clutch gear 534, the third shaft 528, and the pinion gear 716 may be driven with the second gear 544. The pinion gear 716 may drive the drive axle 412, such as via driving a differential via a crown gear. Following, the third arrows 866, the second gear 544 may drive the third gear 546, and the third gear 546 may drive the fourth gear 548. The second input 438 and fourth shaft 530 may be driven with the fourth gear 548. The second input 438 may drive the hydraulic pump assembly 420.

FIG. 8B shows the disconnect feature shifted 440 such that the clutch 532 is opened. More specifically, in FIG. 8B the clutch gear 534 is not engaged, and therein is not meshed or selectively coupled to the second gear 544. The clutch gear 534 may be separated from the second gear via a gap 832. The gap 832 is a distance greater than a threshold such that the clutch gear 534 does not mesh or contact the second gear 544. FIG. 8B shows a second power flow represented by a plurality of fourth arrows 868. The fourth arrows 868 follow the path of the first arrows 862 and third arrows 866 of FIG. 8A, therein the second power flow may drive the same components as the first power flow with exception to components driven via the first branch. The second gear 544 is decoupled from the clutch gear 534 and the third shaft 528, and the pinion gear 716 may remain un-driven as the second gear 544 is driven. Downstream of the second gear 544, the fourth arrows 868 follow the path of the third arrows 866 of FIG. 8A, therein the second power flow may drive the same components as the second branch.

The gear train 522 may be supported by a plurality of bearings and/or bearing assemblies. For example, the first gear 542 may be supported by a third bearing assembly 842. The second gear 544 may be supported by a fourth bearing assembly 844 and a fifth bearing assembly 846. The third gear 546 may be supported by a sixth bearing assembly 848 and a seventh bearing assembly 850. And the fourth gear 548 may be supported by an eighth bearing assembly 852.

The third bearing assembly 842 may be positioned around the first gear 542. More specifically, the third bearing assembly 842 may be positioned radially around an appendage of the first gear 542. The third bearing assembly 842 may be sandwiched radially between the first gear 542 and the gearbox housing 430 and/or the differential carrier 442.

The fourth and fifth bearing assemblies 844, 846 may be radially around the second shaft 526. The fourth and fifth bearing assemblies 844, 846 may be sandwiched radially between the second gear 544 and second shaft 526. The fourth and fifth bearing assemblies 844, 846 may allow the second gear 544 to rotate independently of the second shaft 526.

The sixth and seventh bearing assemblies 848, 850 may be radially around the third gear 546. More specifically, the sixth and seventh bearing assemblies 848, 850 may each be positioned radially around an appendage of the third gear 546. The sixth bearing assembly 848 may be sandwiched radially between the third gear 546 and the first cover 432. The seventh bearing assembly 850 may be sandwiched radially between the third gear 546 and the gearbox housing 430 and/or differential carrier 442.

The eighth bearing assembly 852 may be positioned around the fourth gear 548. More specifically, the eighth bearing assembly 852 may be positioned radially around an appendage of the fourth gear 548. The eighth bearing assembly 852 may be sandwiched radially between the fourth gear 548 and the gearbox housing 430, or the eighth bearing assembly 852 may be sandwiched radially between the fourth gear 548 and the differential carrier 442.

In this way, the disclosed system provides for a drive axle assembly that comprises a gearbox with two inputs, including a first input to mount the electric machine and a second input to mount the PTO device and/or vibrational pump. During the normal operating mode, the electric motor may drive the drive axle for traction and parallel drive the PTO device. The gearbox includes disconnect assembly with a disconnect clutch. The disconnect assembly and disconnect clutch may be hydraulically actuated. The disconnect feature is provided to power the PTO device when traction and driving the drive axle are not desired. The disconnect clutch may close to selectively couple the gear train, splitting rotary power between the PTO device and the drive axle. The disconnect clutch may open to provide rotary power to the PTO device and prevent rotary power from being transferred to the drive axle. The disconnect clutch may be a dog clutch comprising an intermediate gear of the gear train and a clutch gear. The clutch gear may couple and be driven with a shaft rigidly coupled to a pinion gear. The pinion gear may mesh with and drive the gears of a differential of the drive axle. The clutch gear may lock with the intermediate gear to close the disconnect clutch and selectively couple the intermediate gear with shaft and pinion gear. When locked, the pinion gear may be driven via the electric machine.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers and/or transmissions. The subject matter of the present disclosure includes all novel and non-obvious combinations and sub-combinations of the various systems and configurations, and other features, functions, and/or properties disclosed herein.

Note that the example control and estimation routines included herein can be used with various engine, electric machine, transmission, and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A drive train comprising:

a drive axle;

a gearbox connected to the drive axle, where the gearbox comprises a gear train, where the gear train comprises an input gear, an intermediate gear, a PTO output gear, and a disconnect clutch configured to selectively couple the intermediate gear to the drive axle;

an electric motor, where the electric motor is mounted on the gearbox in a longitudinal direction of a vehicle and coupled to the input gear;

a PTO device mounted on the gearbox alongside the electric motor and coupled to the PTO output gear; and a piston, a spring, a fork, and a switch, the fork rigidly coupled to a locking component of the disconnect clutch, the spring pressing on the fork, wherein the piston is driven hydraulically, the piston shifts the fork, and the fork shifts the locking component of the disconnect clutch, wherein closing the disconnect clutch selectively couples the intermediate gear to a shaft, the locking component rigidly coupled to the shaft, the shaft rigidly coupled to a pinion gear.

2. The drive axle of claim 1, wherein the disconnect clutch is a dog clutch and the locking component is a clutch gear, wherein the clutch gear mates with the intermediate gear.

3. The drive axle of claim 1, wherein the shaft and pinion gear are supported via a plurality of bearing assemblies, and the bearing assemblies are fixed in place via a lock nut.

4. The drive axle of claim 1, wherein the gear train includes an idler gear, the input gear is meshed with the intermediate gear, the intermediate gear is meshed with the idler gear, and the idler gear is meshed with the PTO output gear.

5. The drive axle of claim 1, wherein the intermediate gear is positioned radially around the shaft, the intermediate gear supported by a first bearing assembly and a second bearing assembly around the shaft, the first bearing assembly and the second bearing assembly sandwiched radially between the intermediate gear and the shaft.

6. The drive axle of claim 1, wherein the PTO device is a pump assembly comprising a first pump, the first pump having a first axis of rotation, where that rotating elements of the first pump rotate around the first axis of rotation, the first axis of rotation being parallel with a second axis of rotation, where rotating elements of the electric motor rotate around the second axis of rotation.

7. The drive axle of claim 6, wherein the PTO device is an assembly of pumps of a tandem configuration including a second pump, the second pump having the first axis of rotation, where rotating elements of the second pump rotate around the first axis of rotation.

8. An electrified drive train of a vehicle comprising:
   a drive axle, the drive axle including an integrated gearbox;
   an electric machine;
   a vibratory roller;
   a first pump;
   a second pump;
   a first hydraulic motor; and
   a second hydraulic motor;
   wherein the electric machine is rotatably coupled to the integrated gearbox, the integrated gearbox is rotatably coupled to the first pump and the second pump, the electric machine is configured to drive the drive axle, the first pump, and the second pump via the integrated gearbox, the first pump fluidly configured to provide hydraulic power for a first hydraulic circuit including the first hydraulic motor, the first hydraulic motor configured to drive the vibratory roller, the second pump fluidly configured to provide hydraulic power to a second hydraulic circuit including the second hydraulic motor, the second hydraulic motor configured to drive a steering cylinder.

9. The electrified drive train of claim 8, comprising a third hydraulic motor, where the first hydraulic circuit includes the third hydraulic motor, and the third hydraulic motor is configured to vibrate the vibratory roller.

10. The electrified drive train of claim 8, wherein the first pump and second pump are configured in a tandem pump arrangement, where a PTO link driven by the integrated gearbox is configured to drive the first pump and the second pump.

11. The electrified drive train of claim 8, wherein the integrated gearbox comprises a disconnect feature, the disconnect feature selectively coupling the integrated gearbox to the drive axle so the electric machine drives the drive axle.

12. The electrified drive train of claim 8, wherein the second hydraulic motor is configured to drive a crab walk cylinder.

13. The electrified drive train of claim 8, wherein the second hydraulic motor is configured to drive a cylinder edge cutter.

14. The electrified drive train of claim 8, wherein the second hydraulic motor is configured to drive a cylinder chip spreader.

15. An assembly comprising:
   an electric motor;
   a PTO device;
   a dog clutch, comprising clutch gear;
   and a gear train that comprises an input gear, an intermediate gear, an idler gear, and an output gear;
   where the electric motor rotatably couples the input gear via a first input to drive the input gear, the first input meshes with the intermediate gear, the dog clutch comprises the intermediate gear, the intermediate gear selectively couples the clutch gear, the intermediate gear meshes with the idler gear, the idler gear meshes with the output gear, the output gear rotatably couples to a second input, and the second input rotatably couples to drive the PTO device.

16. The assembly of claim 15, wherein when the dog clutch is open, the electric motor drives the PTO device via the gear train.

17. The assembly of claim 15, wherein when the dog clutch is closed, the intermediate gear is selectively coupled to a shaft, and mates the intermediate gear with the clutch gear, where the clutch gear rigidly couples to the shaft, and the electric motor drives the PTO device and the shaft via the gear train, the dog clutch splitting rotary power between the PTO device and the gear train.

18. The assembly of claim 16, wherein the input gear comprises a first opening and the output gear comprises a second opening, the first opening receives a first shaft rigidly coupled to the first input to rigidly couple the first input to the input gear, the second opening receives a second shaft rigidly coupled to the second input to rigidly couple the second input to the output gear.

* * * * *